United States Patent
Zhang et al.

(10) Patent No.: US 9,902,129 B2
(45) Date of Patent: Feb. 27, 2018

(54) PANEL

(71) Applicants: BOE TECHNOLOGY GROUP CO., LTD., Beijing (CN); ORDOS YUANSHENG OPTOELECTRONICS CO., LTD., Ordos (CN)

(72) Inventors: Liang Zhang, Beijing (CN); Shanshan Bao, Beijing (CN); Fuyi Cui, Beijing (CN)

(73) Assignees: BOE TECHNOLOGY GROUP CO., LTD., Beijing (CN); ORDOS YUANSHENG OPTOELECTRONICS CO., LTD., Ordos (CN)

(*) Notice: Subject to any disclaimer, the term of this patent is extended or adjusted under 35 U.S.C. 154(b) by 0 days.

(21) Appl. No.: 15/241,961

(22) Filed: Aug. 19, 2016

(65) Prior Publication Data

US 2017/0282495 A1    Oct. 5, 2017

(30) Foreign Application Priority Data

Mar. 30, 2016   (CN) .......................... 2016 1 0191220

(51) Int. Cl.
  *B32B 7/02*   (2006.01)
  *B32B 7/12*   (2006.01)
  *B32B 3/26*   (2006.01)

(52) U.S. Cl.
  CPC ................. *B32B 7/02* (2013.01); *B32B 3/26* (2013.01); *B32B 7/12* (2013.01); *B32B 2307/73* (2013.01); *B32B 2457/20* (2013.01)

(58) Field of Classification Search
  None
  See application file for complete search history.

(56) References Cited

U.S. PATENT DOCUMENTS

| | | | | |
|---|---|---|---|---|
| 8,755,018 B2 * | 6/2014 | Huang | ................. | G02F 1/1339 349/155 |
| 2001/0026121 A1 * | 10/2001 | Khan | ................. | G02F 1/13394 313/483 |
| 2005/0184969 A1 * | 8/2005 | Dunn | ..................... | G06F 3/045 345/173 |
| 2007/0013292 A1 * | 1/2007 | Inoue | .................... | H05B 33/04 313/504 |
| 2011/0058137 A1 * | 3/2011 | Huang | ................. | G02F 1/1339 349/156 |
| 2012/0327092 A1 * | 12/2012 | Sasagawa | ............. | B81B 7/0058 345/501 |
| 2016/0272535 A1 * | 9/2016 | Yang | ........................ | C09C 3/10 |

FOREIGN PATENT DOCUMENTS

CN          104277501 A  *  1/2015

* cited by examiner

*Primary Examiner* — Tahseen N Khan
(74) *Attorney, Agent, or Firm* — Harness, Dickey & Pierce, P.L.C.

(57) ABSTRACT

A panel is provided by the present disclosure, including a cell defined by a first substrate and a second substrate and a functional component between the first and second substrates. There exist at least two rings of sealant between the first and second substrates. The functional component is sealed by the at least two rings of sealant. The at least two rings of sealant are spaced from each other.

10 Claims, 2 Drawing Sheets

PANEL

CROSS-REFERENCE TO RELATED APPLICATION

This application claims a priority to Chinese Patent Application No. 201610191220.6 filed on Mar. 30, 2016, the disclosures of which are incorporated in their entirety by reference herein.

TECHNICAL FIELD

The present disclosure relates to the technology of sealing cell devices, and in particular to a panel.

BACKGROUND

A cell sealing technology refers to seal a cell formed by oppositely arranging two substrates at a periphery thereof by a sealant. At present, the vast majority of display panels are formed by oppositely arranging an array substrate and a packaging substrate to form a cell. In the related art, the display panel is generally sealed by a single ring of sealant, and then a stress of a laser sintering process performed onto the single ring of sealant is in only one direction, such that a mechanical support ability of the display panel is reduced. In additions, it is found in an environmental reliability test that a damage of a single point of the single ring of sealant may be easily to be spread peripherally, such that the components in the display panel may be aged and malfunctioned rapidly, therefore the service life and the mechanical support ability may not be guaranteed.

SUMMARY

The object of the present disclosure is to solve the issue that mechanical support strength of a cell device sealed by a single ring of sealant is low and a service life thereof is short.

To achieve the object, a panel is provided by the present disclosure, including a cell defined by a first substrate and a second substrate and a functional component between the first and second substrates. There exist at least two rings of sealant configured to seal the functional component, and the rings of the sealant are spaced from each other.

Optionally, the sealant is glass sealant.

Optionally, the rings of the glass sealant are cured by laser sintering processes performed in different directions.

Optionally, a water-resistive and oxygen-resistive material is further arranged between the adjacent two rings of the sealant.

Optionally, the water-resistive and oxygen-resistive material is a desiccant.

Optionally, the water-resistive and oxygen-resistive material is spaced from each of the adjacent two rings of the sealant.

Optionally, the panel is a display panel. The panel further includes a display region enclosed by the rings of the sealant and a spacer between the display region and the rings of the sealant.

Optionally, the spacer includes a spacer body made of a photopolymer material or a photolysis material and a supporting portion within the spacer body.

Optionally, the supporting portion is harder than the spacer body.

Optionally, the supporting portion is made of silicon or silicon oxide, and the spacer body is made of an ultraviolet-curing adhesive or a photoresist.

Optionally, the supporting portion is spherical.

According to the panel provided by the present disclosure, supposing that the region of the sealant of the panel in some embodiments of the present disclosure is identical to that in the related art, the single ring of sealant is divided into a plurality of rings, and thus a total contact area of the sealant and both the first and second substrates may be reduced, thereby reducing a stress action and increasing a mechanical support strength. In addition, a ring of sealant at an inner side may also be functioned to protect the inner component in the case that a ring of sealant at an outer side is broken.

DETAILED DESCRIPTION

In order to make the objects, the technical solutions and the advantages of the present disclosure more apparent, the present disclosure will be described hereinafter in conjunction with the drawings and embodiments.

Figure 1:
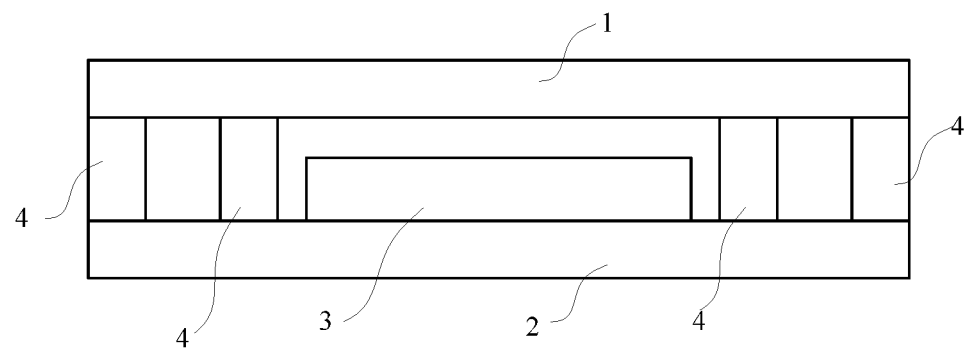
FIG. 1 is a schematic view of a panel in some embodiments of the present disclosure.

In order to solve the issues in the related art, a panel is provided by the present disclosure. As shown in FIG. 1, the panel includes: a first substrate 1 and a second substrate 2 oppositely arranged to form a cell and a functional component 3 arranged between the first substrate 1 and the second substrate 2.

There exist at least two rings of sealant 4 between the first substrate 1 and the second substrate 2 (two rings of sealant 4 are shown in FIG. 1 for illustration). The rings of the sealant 4 are to seal the functional component 3 and are spaced from each other, thereby preventing the functional component 3 from being aged due to a contact with the external environment.

Supposing that a region of the sealant of the panel in some embodiments of the present disclosure is identical to that in the related art, the single ring of sealant is divided into a plurality of rings, and thus a total contact area of the sealant and both the first and the second substrates may be reduced, thereby reducing a stress action and increasing a mechanical support strength. In addition, a ring of sealant at an inner side may also be functioned to protect the inner component in the case that a ring of sealant at an outer side is broken.

In some embodiments of the present disclosure, the sealant may be a glass sealant cured by a laser sintering process. In order to make the stresses of the glass sealant onto the first and the second substrates uniform, optionally laser sintering processes performed onto the rings of the glass sealant are in different directions, thereby avoiding a direct superposition of the stresses of the cured glass sealant which may reduce the mechanical support strength of the display panel.

It can be seen that, in compared with the packaging structure with a single ring of sealant, each ring of the sealant is narrowed in the packaging structure with multiple rings of sealant, and a laser spot may be reduced, thereby reducing a heating area of the glass sealant, significantly reducing the stress between the glass sealants, and reducing a reject ratio during a cutting process.

Figure 2:
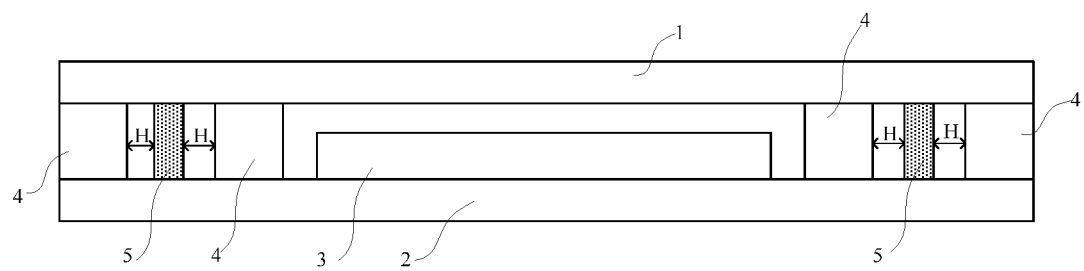
FIG. 2 is a schematic view of a panel shown in FIG. 1 with a water-resistive and oxygen-resistive material in some embodiments of the present disclosure.

In addition, in order to prevent the component from being oxidized, as shown in FIG. 2, in some embodiments of the present disclosure, a water-resistive and oxygen-resistive material 5 (e.g., a desiccant) may be further arranged between the adjacent two rings of the sealant 4. In the case that the ring of the sealant 4 at the outer side is broken, the water-resistive and oxygen-resistive material 5 may effectively prevent vapor and oxygen from entering into the cell and broking the inner component.

Of course, the glass sealant 4 is cured by the laser sintering process, so the water-resistive and oxygen-resistive material 5 may be spaced from each of the adjacent two rings of the sealant 4 by a predetermined distance H, thereby preventing chemical properties of the water-resistive and oxygen-resistive material 5 from being adversely influenced due to the high temperature.

Figure 3:
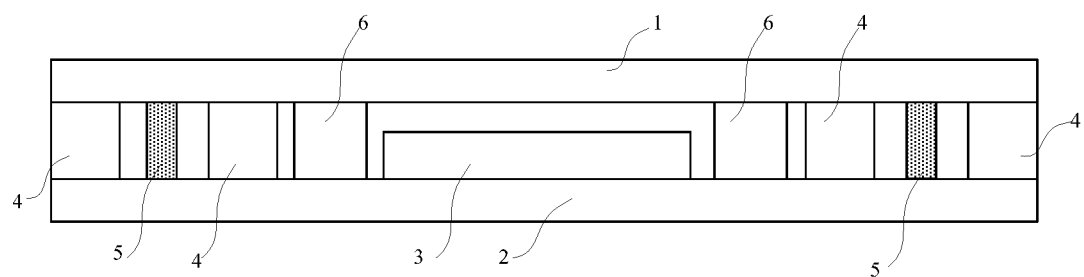
FIG. 3 is a schematic view of a panel with a spacer in some embodiments of the present disclosure.

In addition, in some embodiments of the present disclosure, the panel is a display panel, and then the display effect may be adversely influenced in the case that the distance between the first and the second substrates cannot be kept. The sealant is arranged between at the edge of the display panel, so it is difficult to support the first and the second substrates only by the sealant. Once a pressure is applied onto the display panel, a distance between the first and the second substrates at a center portion of the cell may be larger than that at the edges thereof, and then Newton ring phenomenon may occur at the edges of the displayed image, thereby seriously influencing the user's viewing experience. In view of this, as shown in FIG. 3, in some embodiments of the present disclosure, a spacer 6 is further arranged between the display region of the display panel and the ring of the sealant 4, so as to increase the support strength of regions around the sealant 4.

In the practical application, the spacer 6 in the display panel with a relative small distance between the two substrates may be formed by a stretchy photopolymer material (e.g., an ultraviolet-curing adhesive) or a stretchy photolysis material (e.g., photoresist), so as to buffer the impact onto the display panel.

However, for the display panel with a relative large distance between the two substrates such as the display panel with a 3D display function, the spacer formed by the photopolymer material or the photolysis material need to be thicker, such that a structural strength of the spacer may be reduced and then the spacer is easy to be subsided or deformed. In view of this, as shown in FIG. 4, the spacer in some embodiments of the present disclosure may include a spacer body 61 formed by a photopolymer material or a photolysis material and a supporting portion 62 within the spacer body 61 and configured to support the spacer body 61.

Figure 4:
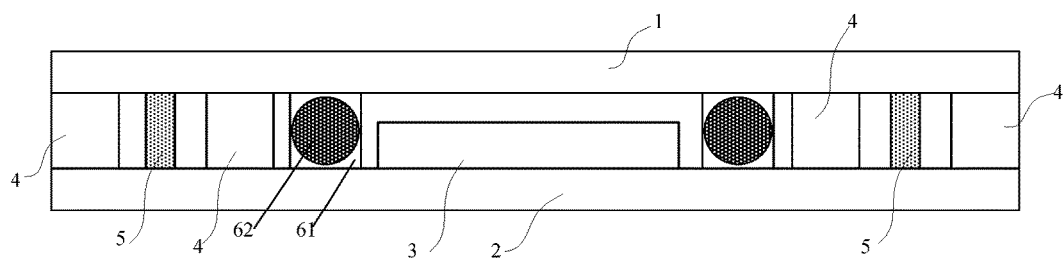
FIG. 4 is a schematic view of a panel with a spacer including a supporting portion in some embodiments of the present disclosure.

It can be seen that, as shown in FIG. 4, the spacer body 61 is formed by an adhesive photopolymer material or an adhesive photolysis material, so that the spacer body 61 can be fixed to the substrate firmly (the first substrate or the second substrate). The supporting portion 62 is arranged in the spacer body 61, so that structural strength of the spacer may be increased, the spacer may not be easy to be subsided or deformed in the case that an external force is applied to the spacer, and the distance between the first and the second substrates may be kept.

Furthermore, in order to make the spacer have higher support strength, optionally, the supporting portion is harder than the spacer body. For example, when the spacer 61 is made of ultraviolet-curing adhesive or a photoresist, the supporting portion 62 may be made of silicon or silicon oxide.

The above are merely the preferred embodiments of the present disclosure. A person skilled in the art may make further modifications and improvements without departing from the principle/spirit of the present disclosure, and these modifications and improvements shall also fall within the scope of the present disclosure. For example, the spacer in some embodiments of the present disclosure may include one or more supporting portions, and the shapes of the supporting portions are not limited to be spherical as shown in FIG. 4. Optionally, in some embodiments of the present disclosure, the water-resistive and oxygen-resistive material between the rings of the sealant may surround the panel continuously or discontinuously.

What is claimed is:

1. A display panel comprising:
    a single cell defined by a first substrate and a second substrate;
    a functional component between the first substrate and the second substrate; and
    at least two rings of sealant between the first substrate and the second substrate;
    wherein the functional component is sealed by the at least two rings of sealant, and the at least two rings of sealant are spaced from each other and arranged at an edge of the display panel,
    wherein the display panel comprises a display region enclosed by the rings of the sealant and a spacer between the display region and the rings of the sealant, and
    wherein the spacer comprises a spacer body and a supporting portion, the spacer body being made of a photopolymer material or a photolysis material and the supporting portion being arranged within the spacer body.

2. The panel according to claim 1, wherein the supporting portion is spherical.

3. The panel according to claim 1, wherein each of the at least two rings of sealant extends along a periphery of the first substrate and the second substrate.

4. The panel according to claim 1, wherein the sealant is glass sealant.

5. The panel according to claim 4, wherein the rings of the glass sealant are cured by laser sintering processes performed in different directions.

6. The panel according to claim 1, further comprising a water-resistive and oxygen-resistive material between every adjacent two rings of the sealant.

7. The panel according to claim 6, wherein the water-resistive and oxygen-resistive material is a desiccant.

8. The panel according to claim 6, wherein the water-resistive and oxygen-resistive material is spaced from each of the adjacent two rings of the sealant.

9. The panel according to claim 1, wherein the supporting portion is harder than the spacer body.

10. The panel according to claim 9, wherein the supporting portion is made of silicon or silicon oxide, and the spacer body is made of an ultraviolet-curing adhesive or a photoresist.

* * * * *